H. S. WHEELER.
LUBRICATION OF BEARINGS.
APPLICATION FILED MAR. 29, 1916.
1,212,862.
Patented Jan. 16, 1917.
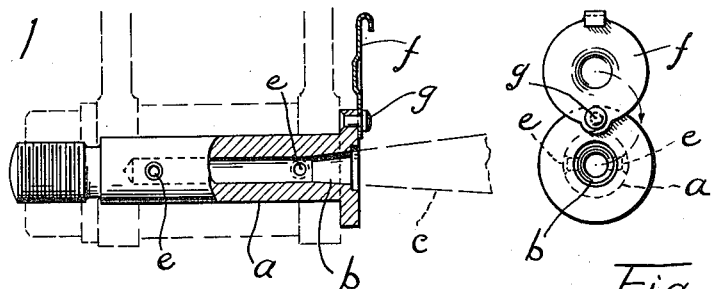
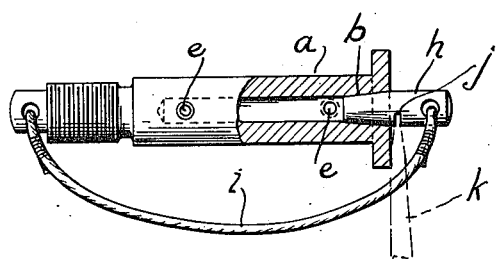
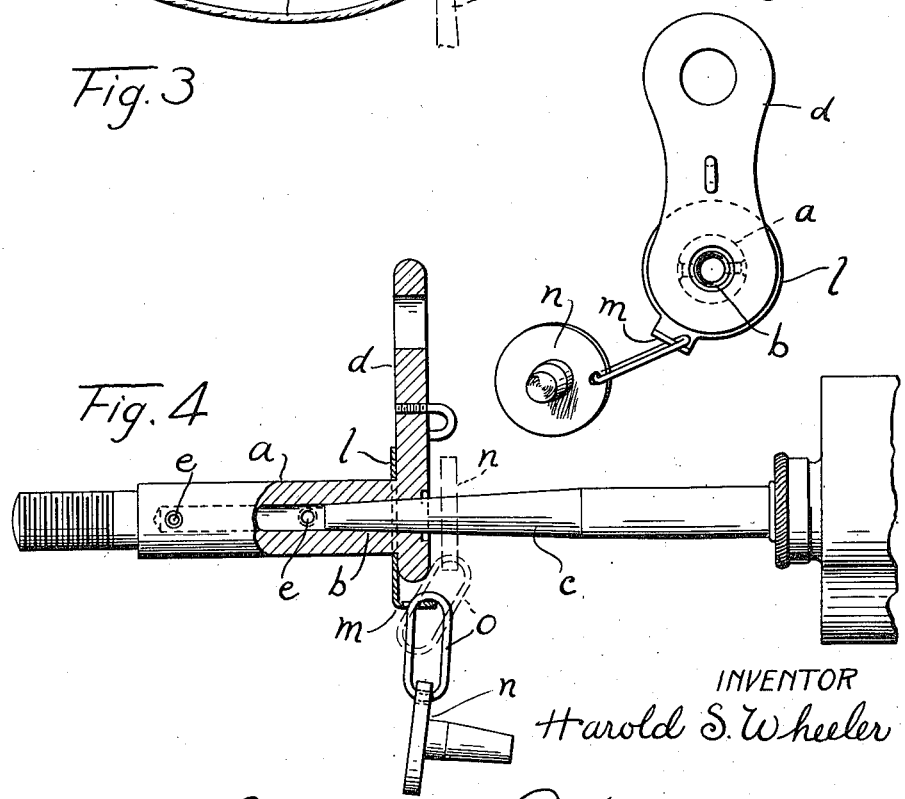
INVENTOR
Harold S. Wheeler
BY Raymond A. Parker ATTORNEY

UNITED STATES PATENT OFFICE.

HAROLD S. WHEELER, OF TACOMA, WASHINGTON.

LUBRICATION OF BEARINGS.

1,212,862.  Specification of Letters Patent.  Patented Jan. 16, 1917.

Application filed March 29, 1916. Serial No. 87,410.

*To all whom it may concern:*

Be it known that I, HAROLD S. WHEELER, a citizen of the United States, residing at Tacoma, county of Pierce, State of Washington, have invented a certain new and useful Improvement in Lubrication of Bearings, and declare the following to be a full, clear, and exact description of the same, such as will enable others skilled in the art to which it pertains to make and use the same, reference being had to the accompanying drawings, which form a part of this specification.

This invention relates to the lubrication of bearings and is shown in connection with shackle bolts, the particular shackle bolts shown being for springs. These bolts are designed to take a lubricant by the introduction of a grease gun and are further provided with means to retain the lubricant.

The purpose of the invention is to do away with the grease cups which are ordinarily used.

In the drawings,—Figure 1 is an elevation partly in section of a simple shackle bolt provided with a disk-like closure. Fig. 2 is an end view of the same bolt. Fig. 3 is an elevation partly in section of a similar shackle bolt but provided with a different kind of closure to retain the oil. Fig. 4 is an elevation partly in section of a shackle bolt having an integral link. This shackle bolt is provided with a still further form of closure. Fig. 5 is an end elevation of the shackle bolt and integral link shown in Fig. 4.

*a* indicates a bearing here shown as a shackle bolt whose shank is hollow for part way of its length, such hollow interior opening at one end with a flaring opening *b* to receive the tapered discharge nozzle *c* of the grease gun. The same arrangement of the interior of the bolt is utilized in the different forms shown in Figs. 1, 3 and 4. The shackle bolt shown in Fig. 4 is provided on its non-threaded end with an integral link *d*.

The idea is to construct bearings and especially the ordinary shackle bolt, with a hollow interior provided with openings *e* which connect with the outside bearing surface of the bearing or shackle bolt. One end of this hollow interior is provided with a suitable flare to receive in tight fit the nozzle of a grease gun, through which a heavy lubricant can be ejected from the grease gun into the interior of the bearing or shackle bolt.

In the form shown in Fig. 1, a rotating cover *f* with a depressed center is utilized. This is held tightly to the head of the bolt by the pivot stud *g*, and consequently when the cover is seated over the open end of the hollow interior the depressed center fits tightly into the countersink in this end of the bolt head and retains the heavy oil in the cavity of the bolt.

In the form shown in Fig. 3, a metal plug *h* is utilized. The opposite end of the bolt is provided with an extension having a perforation through which a cord or chain *i* may be tied which carries on its opposite end the metal plug *h*. This plug may be provided with a transverse slot *j* into which a tool *k* may be inserted to pry the plug out when it is desired to re-fill with oil.

In the form shown in Fig. 4, a ring *l* is slid onto the shackle bolt and this carries a perforated lug *m* to which is attached the cap *n* by a metal link *o*. This cap *n* may be inserted into the flaring opening after the grease gun is withdrawn, and it will securely hold the lubricant in place, and may be pried out by inserting a tool or the finger under the flange of the cap.

The grease gun nozzle is shown tapered but this is not absolutely essential, it being sufficient that the diameter of the end of the nozzle is less than the greatest diameter of the tapered hole in the bearing and is preferably greater than the smallest diameter of the tapered hole.

Although I have shown my invention in use with shackle bolts for springs, it is apparent that it can be used with almost any bearings requiring lubrication, such as universal joints, etc., and hence I do not wish to be understood as limiting myself to shackle bolts.

What I claim is:

A bearing member closed at one end, hollow for part of the way and open at the opposite end, the said interior hollow portion providing an unobstructed reservoir for containing a heavy lubricant, a passage-way connecting the hollow interior of the bearing member and its exterior bearing surface and being of a diameter relatively smaller than that of the hollow interior, a closure for the open end of the bearing member, which is adapted to fit into said end and be taken out therefrom by a sliding movement, and means for securing the said closure permanently to the bearing member, the said open end of the bearing member being designed to take the nozzle of a grease gun, whereby the bearing may be filled with heavy oil by a grease gun and the closure applied to keep the heavy oil in the reservoir formed by the hollow interior of the bearing member.

In testimony whereof, I sign this specification.

HAROLD S. WHEELER.